United States Patent [19]

Patel

[11] Patent Number: 5,193,596
[45] Date of Patent: Mar. 16, 1993

[54] PATTERN CUTTING ASSEMBLY

[76] Inventor: Kanti P. Patel, 601 Grant, Atwood, Kans. 67730

[21] Appl. No.: 814,799

[22] Filed: Dec. 31, 1991

[51] Int. Cl.$^5$ .................................................. B27C 5/06
[52] U.S. Cl. ........................... 144/145 A; 83/413; 83/565; 144/145 R; 144/144.5 GT; 144/372; 144/286 R
[58] Field of Search .............. 83/413, 565; 409/110, 409/121, 125, 126, 130; 144/145 R, 145 A, 145 C, 144.5 GT, 371, 372, 286 R

[56] References Cited

U.S. PATENT DOCUMENTS

| | | | |
|---|---|---|---|
| 1,333,912 | 3/1920 | Grant | 144/145 C |
| 3,473,580 | 10/1969 | Dunn et al. | 144/145 R |
| 4,445,553 | 5/1984 | Hanyzewski et al. | 144/154 |
| 4,644,985 | 2/1987 | Weaver | 144/145 A |
| 4,809,755 | 3/1989 | Pontikas | 144/145 A |
| 4,825,920 | 5/1989 | Evitts | 144/145 R |

Primary Examiner—W. Donald Bray
Attorney, Agent, or Firm—Phillip A. Rein

[57] ABSTRACT

This invention is a pattern cutting assembly including a pattern guide member used in cooperation with a pattern and workpiece holding frame which, in turn, has a workpiece member mounted thereon and used in conjunction with a rotating blade, such as a router blade or a scroll saw blade, to cut a pre-determined accurate pattern within the workpiece member. The pattern cutting guide member includes a main circular support plate with a central opening in which a guide hub member is mounted and a clip connector assembly. The clip connector assembly includes a plurality of spaced clip members for anchoring and positioning in an upper support plate of a router table assembly. The pattern guide member can have the main circular support plate and the central guide hub member provided with a connected slot portion from an outer periphery of the main circular support plate which allows for a continuous blade, such as a jigsaw blade or a scroll saw blade, to be positioned centrally of the guide hub member. The pattern and workpiece holding frame holds a workpiece member and cooperates with the pattern guide member to achieve a pre-determined unique design within the workpiece member.

14 Claims, 2 Drawing Sheets

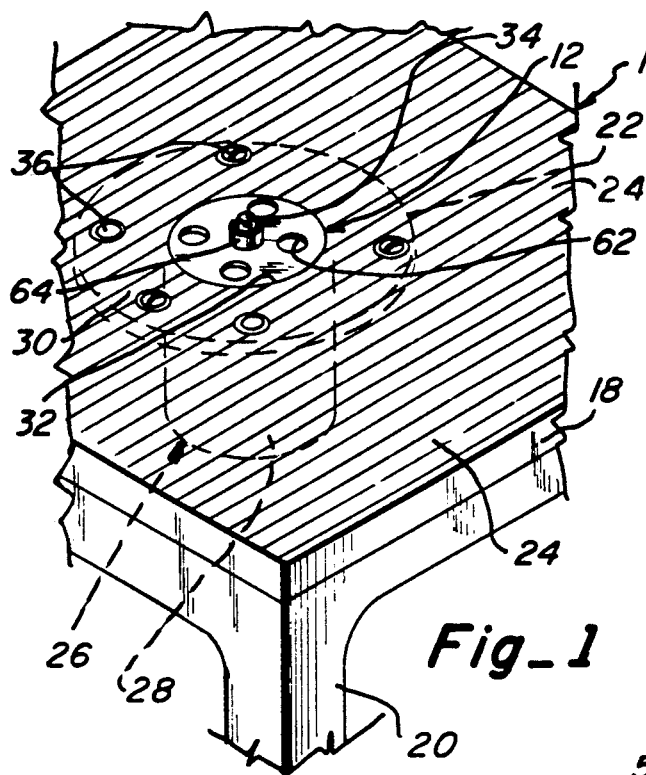
Fig_1
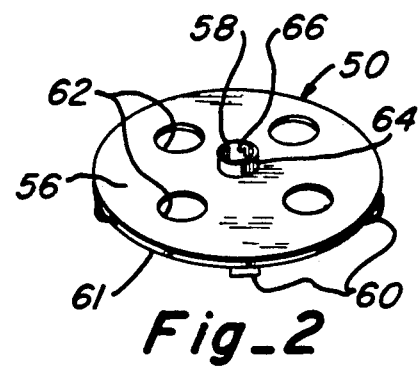
Fig_2
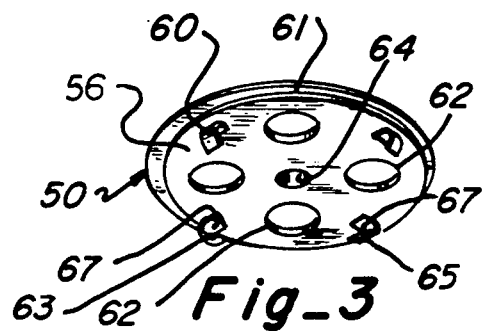
Fig_3
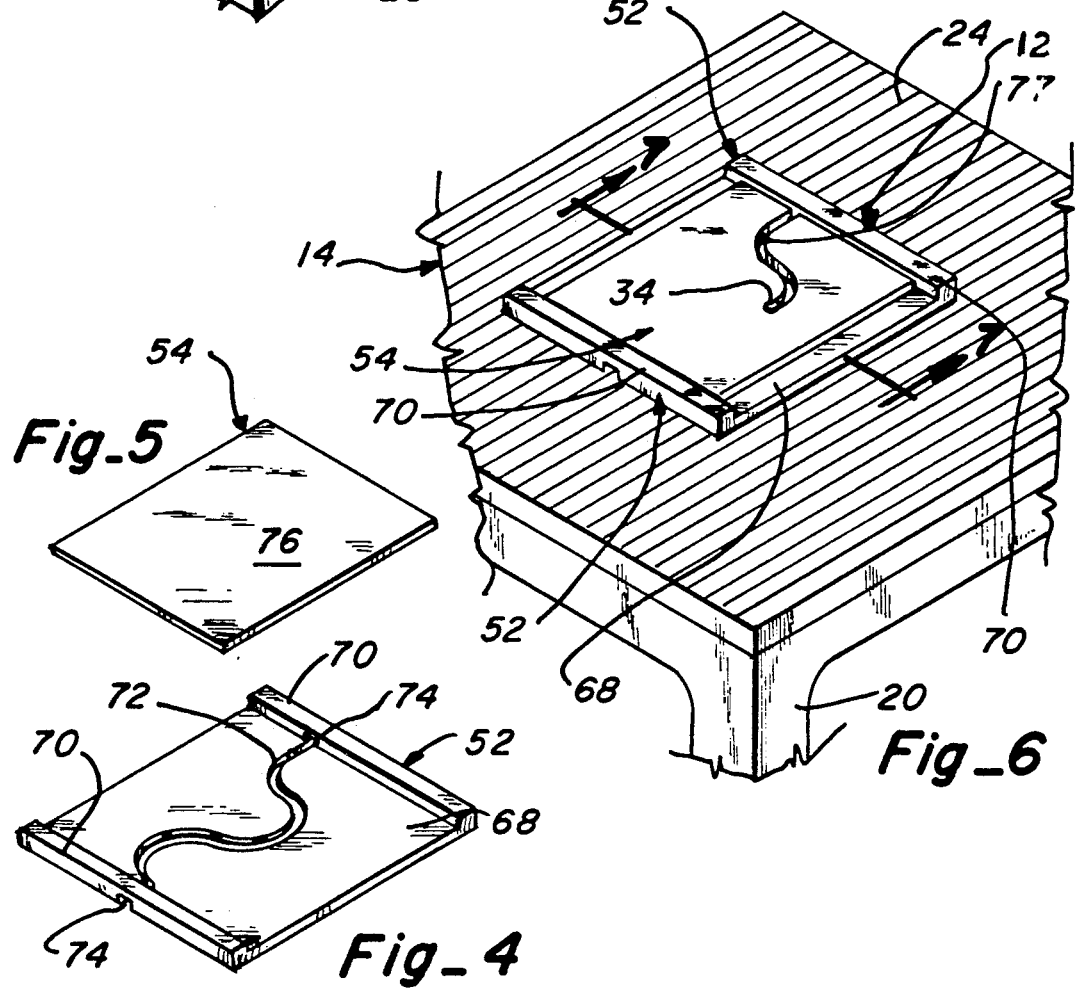
Fig_4
Fig_5
Fig_6

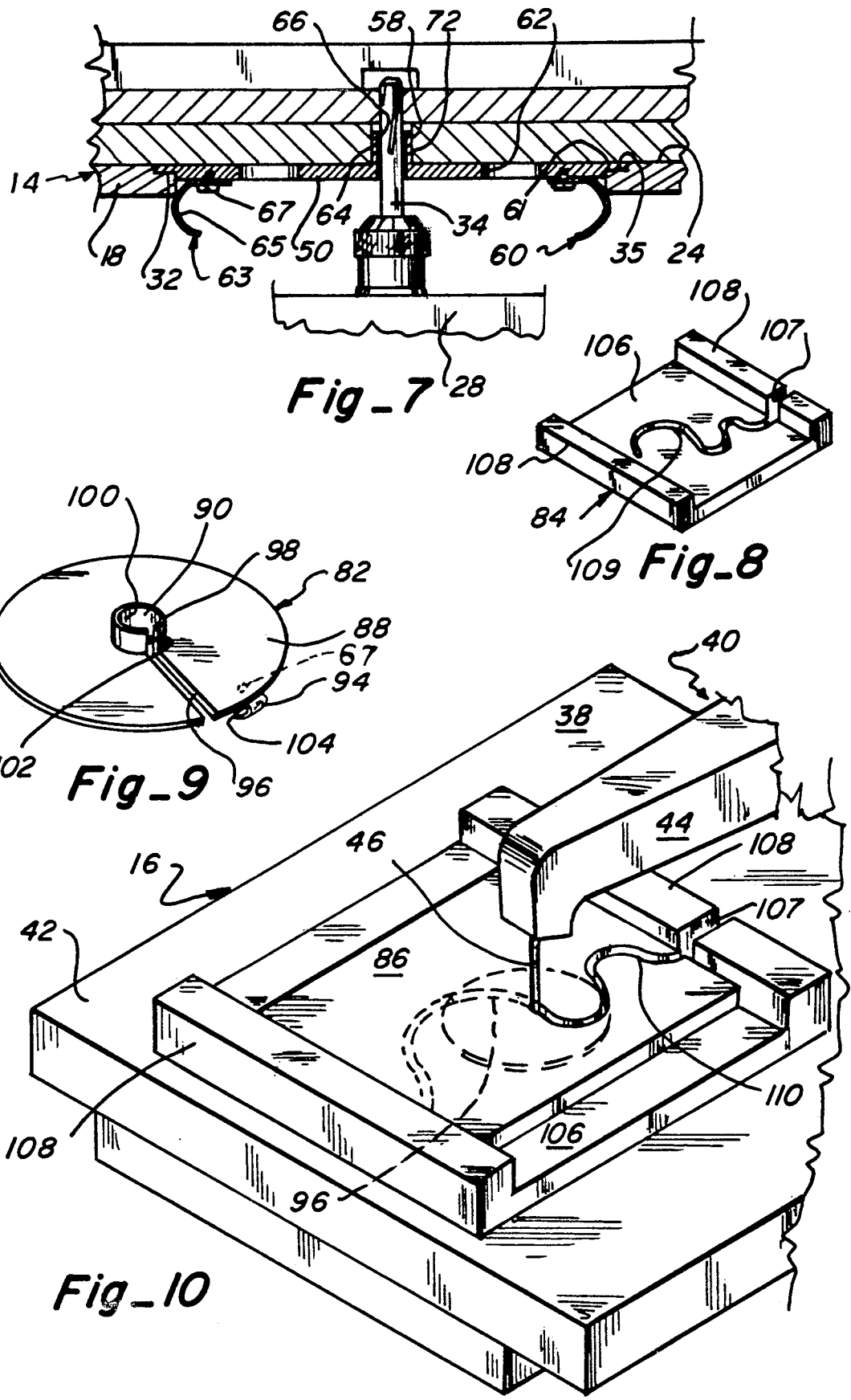

PATTERN CUTTING ASSEMBLY

PRIOR ART

A patent search on this invention revealed the following United States Patents:

| U.S. Pat. No. | Invention | Inventor |
|---|---|---|
| 3,716,085 | ROUTER TEMPLATE ATTACHMENT | Albert L. Wing |
| 3,995,521 | APPARATUS FOR CUTTING ARCS OF CIRCLES WITH BAND SAWS AND THE LIKE | Rouchdy B. Raphael |
| 4,047,458 | DISK GUIDE | Lester W. Hall |
| 4,074,600 | ROTATION APPARATUS FOR WORK PIECES | Rouchdy B. Raphael |
| 4,244,253 | CUTTING GUIDE ATTACHMENT FOR POWER TOOLS | Richard J. Flanigan |
| 4,304,276 | ROUTER TABLE FOR CUTTING LAMINATED PLASTICS | Armando Termini |
| 4,567,927 | APPARATUS FOR AUTOMATICALLY FORMING OVALS | Kenneth O. Plasmann |
| 4,603,716 | MACHINE FOR CONTOURING A WORKPIECE | William J. Rhodes |
| 4,913,206 | ROUTER GUIDE ASSEMBLY | Ilhan Altinbasak |

The Wing patent discloses a router template attachment for use with a router template in order to cut arcuate patterns about a pivot point.

Both of the Raphael patents disclose apparatus for cutting arcs and circles in workpieces.

The Hall patent discloses a guide plate assembly used on a table saw being limited to cutting circles.

The Flanigan patent discloses an attachment for a band saw using a central pivot point to cut circles and other shapes.

The Termini patent discloses a router table for cutting laminated plastics but is limited to using a router member for cutting an edge portion thereof.

The Plamann patent discloses an apparatus for automatically forming ovals in a workpiece utilizing a router cutter blade which is movable relative to a stationary workpiece.

The Rhodes patent discloses a machine for contouring a workpiece but is rather costly and complex.

The Altinbasak patent discloses a router guide assembly for cutting quarter circles and annular pieces from a workpiece with a router itself movable relative to the stationary workpiece.

PREFERRED EMBODIMENT OF THE INVENTION

In one preferred embodiment of this invention, a pattern cutting assembly is utilized with either a router table assembly, a scroll table assembly, a band saw assembly, or the like. The pattern cutting assembly includes a pattern and guide member usable with a pattern and workpiece holding frame in order to cut out a pre-determined ornamental design in a workpiece member to be held within the pattern and workpiece holding frame.

The pattern guide member includes 1) a main circular support plate; 2) a guide hub member secured to an upper side of the main circular support plate and centrally thereof; and 3) a clip connector assembly secured to an underside of the main support plate and being operable for releasable clamping engagement with a cutter table assembly.

The main circular support plate has a plurality, namely four, spaced access holes and having an outer stepped peripheral wall section. The stepped peripheral wall section is operable so as to allow the pattern guide member to be supported within a stepped access opening in a top horizontal work surface of the cutter table assembly.

The guide hub member is of a cylindrical shape having a side wall section with a central tool opening therein to receive a cutting blade therethrough and a portion of the pattern and workpiece holding frame against an outer surface of the side wall section.

The clip connector assembly includes a plurality of clip members, each having a spring body section secured to the main circular support plate by respective anchor members.

The clip members are operable to be mounted in the access opening in the cutter table assembly and holding the pattern guide member in a secure condition about a centrally rotating cutter tool member extended upwardly through the central tool opening in the guide hub member.

The pattern and workpiece holding frame include a main frame base member having parallel side support rails secured at opposite edges thereof. The main frame base member is of a plate or sheet material provided with a pre-determined pattern groove section therein for achieving a pre-determined identical pattern in a workpiece member.

The parallel side support rails are provided with pattern access openings allowing ease of movement of a router tool member to be placed within the pattern groove section.

The workpiece member is a sheet material such as plastic or wood operable on use thereof to receive a workpiece pattern groove section thereon duplicating the pattern groove section through a method of use of this invention.

The method of use of the pattern cutting assembly with the pattern guide member and the pattern and workpiece holding frame in conjunction with the router table assembly is noted in FIG. 6. The workpiece member is mounted between the parallel side support rails of the pattern and workpiece holding frame and held against movement relative thereto.

The workpiece member on the pattern and workpiece holding frame is then placed on a top upper support surface of a main support plate of a router tool assembly. A rotating router blade member extends through the central tool opening in the guide hub member.

The pattern and workpiece holding frame is guided about the guide hub member and follows the pattern groove section in the main frame base member. This is creating an identical cut-out pattern groove section in the workpiece member as presently illustrated by the pattern groove section in the main frame base member of the pattern and workpiece holding frame.

In a second embodiment of this invention having a pattern cutting assembly usable with a scroll table assembly, the pattern cutting assembly includes 1) a scroll saw pattern guide member; 2) a scroll pattern and workpiece holding frame engagable with the scroll saw pattern guide member; and 3) a workpiece member mounted within the scroll pattern and workpiece holding frame.

The scroll saw pattern guide member includes 1) a main saw support plate; 2) a cylindrical guide hub member secured to a central portion of the saw support plate and extended upwardly from one side; and 3) a clip connector assembly secured to an opposite side of main saw support plate.

The main saw support plate has a slot section leading from an outer edge centrally towards the guide hub member.

The guide hub member is provided with a side wall section having a central saw opening therethrough. The side wall section is provided with a slot portion which connects with the slot section in the main saw support plate.

The clip connector assembly includes a plurality of spaced clip members secured to an undersurface on the opposite side of the main saw support plate and operable to be releasably mounted and engagable with an access opening in a main top support plate of the scroll table assembly.

The scroll pattern and workpiece holding frame includes a main frame base member supported on an outer edge thereof by parallel side support rails. The main frame base member is provided with an entrance slot through one of the side support rails leading into a pattern groove section of any desirable configuration.

The workpiece member can be of any workable sheet material such as plastic or wood.

In the use of the second embodiment being the pattern cutting assembly with the scroll table assembly, it is obvious that the workpiece member is placed within the scroll pattern and workpiece holding frame which then can be placed on the main top support plate of the scroll table assembly.

The scroll pattern and workpiece holding frame and connected workpiece member are then moved to a position whereupon the scroll blade member and the guide hub member are positioned adjacent the entrance slot in the one side support rail.

On powering and rotation of the scroll blade member, it is obvious that the scroll pattern workpiece and holding frame is moved inwardly so that the upright guide hub member of the scroll saw pattern guide member is proceeding through and controlled by the pattern groove section in the scroll pattern workpiece and holding frame. This allows the operator thereof to duplicate the pattern groove section in the main frame base member in the workpiece member in a new, novel, and easy manner utilizing the router blade member or the scroll blade member with the pattern cutting assembly of this invention.

OBJECTS OF THE INVENTION

One object of this invention is to provide a pattern cutting assembly which can utilize a power cutter member on a router table assembly or a scroll table assembly in order to follow a selected design pattern and duplicate same on a workpiece member with great precision and accuracy.

Another object of this invention is to provide a pattern cutting assembly including 1) a pattern guide member which is readily attachable to a router table assembly or a scroll table assembly and mounted firmly about a cutting blade member; and 2) a pattern workpiece cutting frame assembly including a main base frame member having a pattern groove section thereon; and 3) a workpiece member mounted on the pattern workpiece and holding frame for conjoint movement about the pattern guide member to duplicate the pattern groove section in the workpiece member.

One further object of this invention is to provide a pattern cutting assembly including 1) a pattern guide member with a slot section to receive a cutting tool to be positioned centrally of a main guide hub member; and 2) a pattern workpiece and holding frame having a main frame base member with a pattern groove section therein which is engagable and directed by the guide hub member to duplicate the pattern groove section in a workpiece member.

Still, another object of this invention is to provide a pattern cutting assembly which is economical to manufacture; easy to use; versatile as can be used on both router and scroll table assemblies; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a fragmentary perspective view illustrating a top surface of a router table assembly having a pattern guide member of the pattern cutting assembly of this invention mounted thereon;

FIG. 2 is a perspective view of the pattern guide member;

FIG. 3 is a perspective view similar to FIG. 2 illustrating a bottom view of the pattern guide member;

FIG. 4 is a perspective view of a pattern workpiece and holding frame of this invention;

FIG. 5 is a perspective view of a workpiece member prior to cutting a pattern thereon;

FIG. 6 is a fragmentary perspective view of the router table as noted in FIG. 1 having the pattern workpiece and holding frame with a workpiece member thereon and illustrating a method of use for cutting a pattern groove section in the workpiece member;

FIG. 7 is an enlarged fragmentary sectional view taken along line 7—7 in FIG. 6;

FIG. 8 is a perspective view of a scroll pattern and workpiece holding frame which is utilized with a scroll table assembly or other cutting work tool having a continuous blade therein in a second embodiment of this invention;

FIG. 9 is a perspective view of a scroll saw pattern guide member of the second embodiment of this invention; and FIG. 10 is a perspective view of a top surface of the scroll table assembly being used to cut a pre-determined pattern in a workpiece member utilizing the scroll pattern and workpiece holding frame with a workpiece member mounted therein and engagable with the scroll saw pattern guide member.

The following is a discussion and description of preferred specific embodiments of the pattern cutting assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 6, a pattern cutting assembly of this invention, indicated generally at 12, is illustrated as utilized on a router table assembly 14 or on a scroll table assembly 16 (FIG. 10).

The router table assembly 14 is of a conventional type including a main support plate 18 supported on spaced support leg members 20 and having a power router assembly 22 connected to the main support plate 18. The main support plate 18 is provided with an upper working support surface 24.

The power router assembly 22 includes a router motor assembly 26 having a motor member 28 with an outer anchor flange 30. The main support plate 18 is provided with an access opening 32 though which is extended a router blade member 34. The router blade member 34 is extended centrally of the access opening 32 and projects above the upper support surface 24 of the main support plate 18.

As noted in FIG. 1, the anchor flange 30 is secured as by a plurality of spaced screw members 36 against an undersurface of the main support plate 18.

The access opening 32 is provided with a stepped portion 35 operable to receive a portion of the pattern cutting assembly 12 therein in a manner to be explained.

The scroll table assembly 16 is provided with a main top support plate 38 and having a power scroll assembly 40 connected thereto. The main top support plate 38 is provided with an upper working support surface 42 and may be mounted on support leg members 20 or any horizontal support surface.

The power scroll assembly 40 includes a blade support arm 44 having a scroll blade member 46 operable in a conventional manner.

The pattern cutting assembly 12 includes 1) a pattern guide member 50; 2) a pattern workpiece and holding frame 52; and 3) a workpiece member 54 to be held within the pattern workpiece and holding frame 52.

As shown in FIG. 2, the pattern guide member 50 includes 1) a main support plate 56; 2) a guide hub member 58 connected to an upper surface of the main support plate 56; amd 3) a clip connector assembly 60 secured to an undersurface of the main support plate 56.

The main support plate 56 can be constructed of a steel or aluminum sheet material provided with spaced flow openings 62 and an outer stepped peripheral wall section 61. The flow openings 62 are operable to allow air flow and passage of cut materials therethrough.

The stepped peripheral wall section 61 is adapted to be placed in the access opening 32 and, more particularly, the stepped portion 35 in the main support plate 18 of the router table assembly 14 as noted in FIG. 7.

The guide hub member 58 is provided with a cylindrical side wall section 64 having a central tool opening 66 adapted to receive the router blade member 34 therethrough during a pattern cutting operation as will be explained.

The clip connector assembly 60 is provided with a plurality, namely four, clip members 63 each having a spring body section 65 secured by an anchor member 67 to an undersurface of the main support plate 56 as noted in FIG. 3.

The clip members 63 and, more particularly, the respective spring body sections 65 are operable to engage an inner lower edge of the access opening 32 in the main support plate 18 as clearly shown in FIG. 7. This provides a retaining means and permits the pattern guide member 50 to be easily removed from the access opening 32 in the main support plate 18 of the router table assembly 14.

As shown in FIG. 4, the pattern workpiece and holding frame 52 is provided with a main frame base member 68 being supported on opposed edges thereof by parallel support rails 70. The main frame base member 68 is of a plate or sheet construction and having a pattern groove section 72 therein as noted in FIG. 4.

The pattern groove section 72 is shown in an arcuate curved design but can be of any design and shape.

One or both of the side support rails 70 are provided with a pattern access opening 74 which may be used as the starting point into the pattern groove section 72 to create an identical pattern on the workpiece member 54 in a manner to be explained.

The workpiece member 54 is normally a plate or sheet member constructed of plastic, wood, or other similar materials and being a workable sheet material 76.

The method of use of the pattern cutting assembly 12 is operable to produce a workpiece pattern groove section 77 in the workpiece member 54 which would be identical to the pattern groove section 72 in the main frame base member 68 in a process which will be described.

In a second embodiment of this invention, the pattern cutting assembly 12 is modified so as to be usable with the scroll table assembly 16 with the scroll blade member 46. These changes are necessary as the scroll blade member 46 or a jigsaw blade or band saw blade may be a continuous blade member and cannot be used utilizing the pattern guide member 50 and the pattern and workpiece holding frame 52 as described in the first embodiment.

The second embodiment of the pattern cutting assembly 12 includes 1) a scroll saw pattern guide member 82; 2) a scroll pattern workpiece and holding frame 84; and 3) a workpiece member 86.

On referring to FIG. 9, the scroll saw pattern guide member 82 includes 1) a circular main saw support plate 88; 2) a guide hub member 90 mounted on an upper surface of the main saw support plate 88; and 3) a clip connector assembly 94 secured to an undersurface of the main saw support plate 88.

The main saw support plate 88 is provided with a radial slot section 96 leading to a central tool opening 100 therein. Additionally, the main saw support plate 88 may be provided with spaced flow openings 62 and the stepped peripheral wall section 61 as described in the main support plate 56 of the pattern guide member 50 in the first embodiment. In fact, the main saw support plate 88 may be mounted within an access opening 32 in the main top support plate 38 of the scroll table assembly 16 in a manner as previously described in the first embodiment.

The guide hub member 90 is provided with a cylindrical side wall section 98 mounted about the central tool opening 100 and having a slot portion 102 in the side wall section 98 for reasons to become obvious.

The clip connector assembly 94 is as previously described for the clip connector assembly 60 having clip members 104 secured by another members 67 to the undersurface of the main saw support plate 88.

The scroll pattern and workpiece holding frame 84 is provided with a main base frame member 106 interconnected by spaced, parallel side support rails 108. The main frame base member 106 is provided with a laterally extended entrance slot 107 in one of the side support rails 108 leading to a pre-determined pattern groove section 109.

The workpiece member 86 is of a sheet plastic, wood, or other similar materials adapted to be placed within the confines of the side support rails 108 of the scroll pattern and workpiece holding frame 84 as noted in FIG. 10.

During the use of the pattern cutting assembly 12 of this invention in the second embodiment, the workpiece member 86 receives a work pattern groove or cut 110 which would be identical to the pre-determined pattern groove section 109 in the main frame base member 106 as noted in FIGS. 8 and 10.

It is noted that the pattern guide member 50 in the first embodiment and the scroll saw pattern guide member 82 in the second embodiment are substantially identical with slight modifications to allow a continuous band saw blade or the scroll blade member 46 1) to gain access through the scroll pattern and workpiece hold frame 84 by the entrance slot 107 in the side support rail 108; and 2) to be inserted through the slot section 96 and the slot portion 102 in the scroll saw pattern guide member 82 to be positioned centrally of the guide hub member 90.

USE AND OPERATION OF THE INVENTION

In the use and operation of the pattern cutting assembly 12 of this invention with the router table assembly 14, the first step is for the operator to place the pattern guide member 50 within the access opening 32 in the main support plate 18 as noted in FIG. 1.

In this position, the main support plate 56 is placed with the stepped peripheral wall section 61 mounted within the stepped portion 35 of the main support plate 18 of the router table assembly 14. The clip connector assembly 60 operates to hold the main support plate 56 in the access opening 32 (FIG. 7).

In the next step, the operator would select one of perhaps numerous ones of pattern and workpiece holding frames 52 having a selected pattern groove section 72 therein depending on the type of design and cut desired to be achieved on the workpiece member 54.

The operator would then place a workpiece member 54 of a selected thickness and material, such as wood, plastic, or the like, onto the top surface of the main frame base member 68 of the pattern workpiece and holding frame 52 as noted in FIG. 6.

The operator would next place the assembled workpiece member 54 in the pattern workpiece and holding frame 52 onto the upper support surface 24 of the main support plate 18. The pattern and workpiece holding frame 52 would be moved to position the guide hub member 58, with the router blade member 34 positioned centrally thereof, so that the pattern access opening 74 would receive the guide hub member 58 therein.

Next, the power router assembly 22 would be energized and the router motor assembly 26 would rotate the pre-selected router blade member 34 in a conventional manner.

The operator would then grasp the parallel side support rails 70 in order to move the assembled workpiece member 54 and the pattern and workpiece holding frame 52 in a manner in which the guide hub member 58 is moved within the pattern groove section 72 while the workpiece member 54 is held so as not to be movable relative to the now moving pattern and workpiece holding frame 52.

During this operation, as noted in FIG. 6, a workpiece pattern groove section 77 is formed within the workpiece member 54 by the rotating router blade member 34 extended outwardly from the guide hub member 58.

At the end of this particular cutting operation, it is noted that the workpiece pattern groove section 77 will extend completely across the workpiece member 54 and exit out the pattern access opening 74 in the other side support rail 70 to achieve a completed workpiece pattern groove section 77 identical to the pre-determined pattern groove section 72 in the main frame base member 68.

It is obvious that this router cutting operation can be repeated as desired with any pattern to conform to that selected within the main frame base member 68 of the pattern and workpiece holding frame 52.

The width and shape of the workpiece pattern groove section 77 created in the workpiece member 54 can be determined and varied by the size of the router blade member 34 being utilized and the size of the guide hub member 58 in the pattern guide member 50.

In the use of the pattern cutting assembly 12 in the second embodiment with the scroll table assembly 16, the scroll saw pattern guide member 82 is utilized with the scroll pattern and workpiece holding frame 84 and the workpiece member 86 which is identical to the workpiece member 54.

As in the first embodiment, the operator would place the scroll saw pattern guide member 82 within an access opening 32 in the main top support plate 38 of the scroll table assembly 16. It would be held therein by the clip connector assembly 94 as previously described in the first embodiment with the clip connector assembly 60.

It is noted that the special design of the scroll saw pattern guide member 82 with the slot section 96 and the slot portion 102 in the guide hub section 90 allows the scroll blade member 46 to be trained therethrough so as to be positioned centrally of the guide hub member 90 before anchoring to the access opening 32 in the main top support plate 38. Of course, this would not be possible without the presence of the slot section 96 and slot portion 102.

Next, the operator would place the workpiece member 86 within the confines of the side support rails 108 as noted in FIG. 10. The assembled scroll pattern and workpiece holding frame 84 and the workpiece member 86 is thereupon placed on the upper support surface 42 of the main top support plate 38 of the scroll table assembly 16.

The operator would then move the assembled combination and, more specifically, the scroll pattern and workpiece holding frame 84 so as to place the scroll blade member 46 in a position within the entrance slot 107 in one of the side support rails 108.

The operator would next hold the workpiece member 86 firmly against the scroll saw pattern guide member 82 and move the guide hub member 90 within the pattern groove section 109 in the main frame base support member 106. The scroll blade member 46 will be concurrently cutting the workpiece pattern groove 110 in the workpiece member 86.

On completion of cutting the workpiece pattern groove 110, it is noted that the workpiece member 86 would be removed and the operator would then move the scroll pattern and workpiece holding frame 84 so as to exit out the entrance slot 107 and be positioned for another cutting procedure.

The pattern cutting assembly of this invention is economical to manufacture; easy to use; precisely operable to duplicate a pattern from a pattern and workpiece holding frame; operable with either a rotating router blade member or a continuous blade member such as a jigsaw, scroll saw, band saw, or the like; and substantially maintenance free.

While the invention has been described in conjunction with preferred specific embodiments thereof, it will be understood this description is intended to illustrate and not to limit the scope of the invention, which is defined by the following claims:

I claim:

1. A pattern cutting assembly operable to cut a preselected pattern in a workpiece member, comprising:
   a) a pattern guide member having a guide hub member mounted on a cutting tool support plate about a cutting tool member;
   b) a pattern and workpiece holding frame having a main support base member with a selected cut-out pattern section therein and operable to support the workpiece thereon; and
   c) said cut-out pattern section encloses and engages said guide hub member and movable relative thereto to duplicate said cut-out pattern section in the workpiece member.

2. A pattern cutting assembly as described in claim 1, wherein:
   a) said pattern guide member having a clip connector assembly mounted thereon for firm connection to the cutter tool support plate mounted about the cutting tool member.

3. A pattern cutting assembly as described in claim 1, wherein:
   a) said pattern and workpiece holding frame having a pair of spaced side support rails connected to outer edges of said main support base member; and
   b) at least one of said side support rails having a pattern access opening therein to permit said guide hub member to enter into said cut-out pattern section on initiating a cutting operation on the workpiece member.

4. A pattern cutting assembly operable to cut a preselected pattern in a workpiece member, comprising:
   a) a pattern guide member mounted on a cutting tool support plate about a cutting tool member;
   b) a pattern and workpiece holding frame having a main support base member with a selected cut-out pattern section therein and operable to support the workpiece thereon;
   c) said pattern and workpiece holding frame engages said pattern guide member and movable relative thereto to duplicate said cut-out pattern section in the workpiece member;
   d) said pattern guide member includes a main support plate having a guide hub member extended therefrom; and
   e) said guide hub member having a central tool opening to be placed about the cutting tool member and being engagable with said cut-out pattern section but allowing the cutting tool member to engage the workpiece member to produce said cut-out pattern section therein.

5. A pattern cutting assembly as described in claim 4, wherein:
   a) said guide hub member extended upwardly a distance equal to or less than a thickness of said main support base member to achieve the pre-selected said cut-out pattern section in the workpiece member.

6. A pattern cutting assembly as described in claim 4, wherein:
   a) said pattern and workpiece holding frame includes said main base frame member interconnected to parallel side support rails; and
   b) said parallel side support rails being operable to engage and hold the workpiece member therein against movement relative to said main frame base member.

7. A pattern cutting assembly as described in claim 6, wherein:
   a) at least one of said side support rails having a pattern access opening operable to allow movement of said pattern guide member therethrough at an initial point of beginning a cutting operation on the workpiece member.

8. A pattern cutting assembly operable with a router table assembly having a rotating cutter member to produce a pre-selected cut-out pattern in a workpiece member, comprising:
   a) a pattern guide member mounted on the router table assembly including a main support plate and a guide hub member;
   b) said pattern guide member mounted about the rotating cutter member;
   c) a pattern and workpiece holding frame having a main support base member with a selected cut-out pattern section therein and operable to support a workpiece member thereon; and
   d) said cut-out pattern section encloses and engages said guide hub member and movable relative thereto to duplicate said cut-out pattern section in the workpiece member.

9. A pattern cutting assembly as described in claim 8, wherein:
   a) said selected cut-out pattern section which is slightly greater than said guide hub member to permit movement therein in any direction while engaging and enclosing said guide hub member to achieve cut-out in the workpiece member in any given pre-selected direction therein.

10. A pattern cutting assembly operable with a router table assembly having a rotating cutter member to produce a pre-selected cut-out pattern in a workpiece member, comprising:
    a) a pattern guide member mounted on the router table assembly including a main support plate and a guide hub member;
    b) said pattern guide member mounted about the rotating cutter member;
    c) a pattern and workpiece holding frame having a main support base member with a selected cut-out pattern section therein and operable to support a workpiece member thereon;
    d) said cut-out pattern section engages said guide hub member and movable relative thereto to duplicate said cut-out pattern section in the workpiece member; and
    e) said guide hub member extended upwardly a distance from said main support plate equal to or less than a thickness of said main support base member whereby the rotating cutter member does not contact said main support base member but cuts said cut-out pattern section in the workpiece member.

11. A pattern cutting assembly as described in claim 10, wherein:

a) said pattern guide member having a clip connector assembly mounted thereon for firm connection to the router table assembly mounted about the rotating cutter member.

12. A pattern cutting assembly as described in claim 10, wherein:
   a) said pattern and workpiece holding frame having a pair of spaced side support rails connected to outer edges of said main support base member to add rigidity thereto and provide support against lateral movement of the workpiece member mounted between and operable to contact one or more of said side support rails to hold the workpiece member in a non-moving condition relative to said pattern and workpiece holding frame during a cutting operation.

13. A pattern cutting assembly as described in claim 12, wherein:
   a) at least one of said side support rails having a pattern access opening therein to permit said guide hub member to enter into said cut-out pattern section on initiating a cutting operation on the workpiece member.

14. A pattern cutting assembly as described in claim 10, wherein:
   a) said main support plate having a plurality of spaced flow openings therein positioned around said guide hub member to allow air flow and movement of cut particles from between the workpiece member and an upper surface of said main support base member.

* * * * *